United States Patent [19]

Nobbs et al.

[11] 4,066,197
[45] Jan. 3, 1978

[54] VEHICLE ROOF RACK

[75] Inventors: William Harry Nobbs, Bury; Harold Bowker; Peter Frank Tyburski, both of Radcliffe, all of England

[73] Assignees: William Harry Nobbs, Bury; Harold Bowker; Peter Frank Tyburski, both of Radcliffe; Geoffrey Hesketh, Bury, all of England; part interest to each

[21] Appl. No.: 696,943

[22] Filed: June 17, 1976

[30] Foreign Application Priority Data

Aug. 9, 1975 United Kingdom .............. 33293/75
Dec. 10, 1975 United Kingdom .............. 50553/75

[51] Int. Cl.² ............................................ B60M 9/04
[52] U.S. Cl. .................................. 224/42.01; 108/11; 108/17; 108/44; 224/42.1 E
[58] Field of Search ............... 297/157, 159, 174, 129, 297/118, 119; 108/107, 106, 44, 11, 16, 17; 211/2; 224/42.01, 42.1 E

[56] References Cited

U.S. PATENT DOCUMENTS

| 2,411,658 | 11/1946 | La Rue | 297/159 |
| 2,708,613 | 5/1955 | Heckman | 224/42.01 |
| 2,722,971 | 11/1955 | Gallagher et al. | 297/157 |
| 2,800,379 | 7/1957 | Smithers | 297/157 |
| 3,731,859 | 5/1973 | Bean, Jr. | 108/44 |

FOREIGN PATENT DOCUMENTS

| 145,526 | 3/1952 | Australia | 297/157 |
| 1,104,635 | 11/1955 | France | 297/157 |

Primary Examiner—Roy D. Frazier
Assistant Examiner—William E. Lyddane
Attorney, Agent, or Firm—Ross, Ross & Flavin

[57] ABSTRACT

The vehicle roof rack comprises a rectangular framework including opposed side frames, opposed end frames, and a base formed by the least two panel members extending between the side frames. One of the panel members is adjustably mounted so that, when the roof rack is removed from a vehicle and is inverted to bring the base uppermost, the adjustable panel member may be raised relative to the side frames so as to form a table, while the other panel member(s) provides a seat alongside the table. The resulting table and seat unit is primarily intended for use in outdoor activities such as camping and picnicing.

9 Claims, 3 Drawing Figures

VEHICLE ROOF RACK

FIELD OF THE INVENTION

This invention concerns a vehicle roof rack.

DESCRIPTION OF THE PRIOR ART

There are many varied forms of vehicle roof rack. Generally, the known roof racks are adequate for their intended purpose of carrying suitable goods on a vehicle roof. Roof racks are particularly useful for carrying goods in pursuit of outdoor activities such as camping. On such occasions, however, it commonly transpires that the amount of equipment to be transported places a strain on the carrying capacity of the roof rack. It would therefore be an advantage if the roof rack could be put to a useful purpose at the site of the outdoor activity so as to reduce the amount of equipment which might otherwise be required.

SUMMARY OF THE INVENTION

An object of the present invention is to provide a roof rack which is convertible to form a table and seating unit suitable for camping and picnicing use.

With this object in view the present invention provides a vehicle roof rack comprising a framework of opposed side frames interconnected by opposed end frames which together form a rectangular box-like configuration, at least two panel members extending between the opposed side frames, and means for adjusting the height of one of the panel members relative to the side frames and the or each remaining panel member.

Preferably two non-adjustable panel members are provided, being disposed one at each end of the framework with the adjustable panel member being disposed between the non-adjustable panel members.

The or each non-adjustable panel member may be in the form of a bench seat or in the form of two or more individual seats arranged side-by-side.

The adjustable panel member may be supported by adjustable frame members extending perpendicularly relative to the side frames, the adjustable frame members and the side frames having mutually co-operable means for securing the adjustable panel member in at least two positions relative to the side frames.

The means for securing the adjustable panel member may comprise apertures in the side frames and in the adjustable frame members and which are selectively alignable at a plurality of positions of the adjustable panel member relative to the side frames, and securing members insertable through the selectively aligned apertures to retain the adjustable panel member in its selected position.

The securing members are preferably bolts having internally-threaded fasteners, preferably wing nuts, mounted thereon.

Preferably the side frames and end frames are formed of tubular aluminum bars riveted or otherwise secured together.

Alternatively the side frames and end frames may be formed of sheet material such as wood or metal.

BRIEF DESCRIPTION OF THE DRAWING

A preferred embodiment of roof rack according to the invention will now be described further, by way of example, with reference to the accompanying drawing, wherein.

DESCRIPTION OF THE PREFERRED EMBODIMENT

Figure 1:
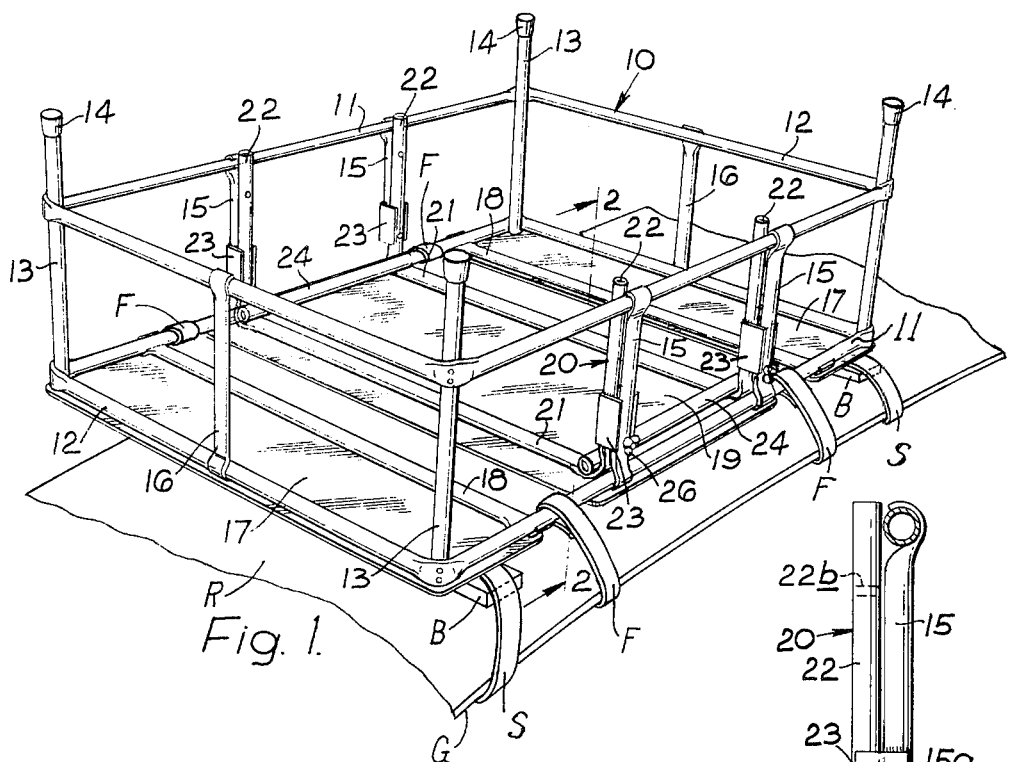
FIG. 1 shows the roof rack in a condition of use in readiness for being mounted on a vehicle roof.

With reference to FIG. 1, the vehicle roof rack comprises a framework 10 of 1-inch diameter tubular aluminium forming a rectangular box-like configuration approximately 48 inches long, 34 inches wide and 17 inches high. The framework 10 comprises a pair of side frames 11 having two substantially parallel horizontal rails vertically spaced about ten inches apart, and a pair of end frames 12 also having two substantially parallel horizontal rails vertically spaced about ten inches apart. The side frames 11 and end frames 12 are connected together at the corners of the framework 10 where respective vertical frame members 13, each approximately 17 inches long, interconnect the upper and lower horizontal rails of the side frames 11 and end frames 12, and extend to a height of approximately 5 inches above the upper horizontal rails. The upper ends of the vertical frame members 13 have respective caps 14 of rubber or plastics material mounted thereon. The horizontal rails of each of the side frames 11 are braced by two intermediate vertical frame members 15 spaced approximately 16 inches apart and approximately 16 inches from respective ends of the framework 10. The horizontal rails of each of the end frames 12 are similarly braced by a single intermediate frame member 16 disposed at substantially the centre of the horizontal rails.

Forming the base of the roof rack are three panel members which extend between the side frames 11. Two of the panel members 17 are non-adjustably secured to the framework 10, these each having a width of approximately 9 inches and being attached to the undersides of the lower horizontal rails at respective ends of the framework 10. Two further horizontal strengthening rails 18 extend between the lower rails of the side frames 11, each at a position above the inner longitudinal side edge of a respective one of the panel members 17. The third panel member 19 has a width of approximately 20 inches and is adjustably mounted (as will be hereinafter fully explained) centrally across the width of the framework 10 so that its ends lie respectively below the undersides of the lower horizontal rails of the side frames 11. Thus a space of approximately 5 inches exists between each longitudinal side edge of the adjustable panel member 19 and a respective one on the non-adjustable panel members 17.

The adjustable panel member 19 is mounted on a sub-frame 20 which is itself vertically adjustable relative to the main framework 10. The sub-frame 20 is also formed of one-inch diameter aluminium tubing and includes two transverse frame members 21 extending between the lower horizontal frame members of the side frames 11. Each end of these transverse frame members 21 is integrally formed with a vertical extension piece 22 which extends substantially parallel and adjacent a respective one of the intermediate vertical frame members 15 of the side frames 11. These intermediate vertical frame members 15 each have a pair of side flanges 23 which extend inwardly of the main framework 10 to embrace the sides of a respective one of the vertical extension pieces 22 so as to form a vertical guide thereof. The transverse frame members 21 are connected together by connector bars 24 which extend substantially parallel with and adjacent respective ones of the lower horizontal rails of the side frames 11.

Figure 2:
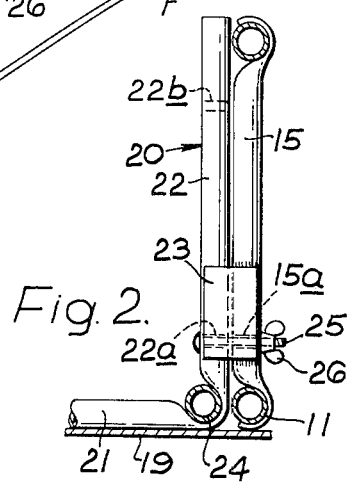
FIG. 2 is a section on the line 2—2 of FIG. 1.

As can be seen from FIG. 2, the lower end of each intermediate vertical frame member 15 of the side frames 11 has a transverse aperture 15a therethrough which is selectively alignable with at least two similar apertures 22a and 22b respectively through the lower and upper ends of the corresponding vertical extension piece 22 of the adjustable sub-frame 20. A bolt 25 is insertable through each pair of aligned apertures 15a, 22a or 15a, 22b, and a wing nut 26 is placeable on each inserted bolt 25 so as to retain the adjustable panel member 19 in one of two selectable positions.

In its normal position the adjustable panel member 19 is retained in substantial alignment with the non-adjustable panel members 17 by securing the bolts 25 through the apertures 15a of the intermediate vertical frame members 15 and through the apertures 22a at the lower ends of the vertical extension pieces 22. In this position the two panel members 17 and the panel member 19 together form a base of the roof rack, as shown in FIG. 1.

In use, the roof rack may be secured to a vehicle roof R by means of known fastener devices. For example, the roof rack may be laid upon a pair of roof bars B mounted across the vehicle roof and secured by straps S to the vehicle gutter G. The roof rack then may be secured to the vehicle gutter by suitable fastener devices F which hook around the lower horizontal rails of the side frame 11, for example at each of the spaces between the adjustable panel member 19 and each of the non-adjustable panel members 17.

Figure 3:
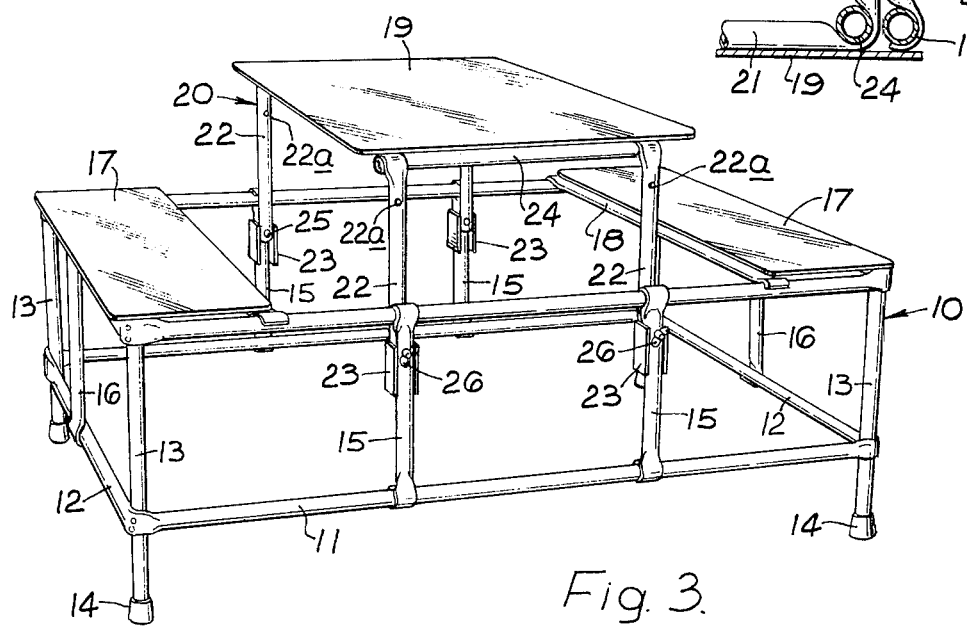
FIG. 3 shows the roof rack when converted to form a table and seating unit suitable for camping and picnicing use.

The roof rack is convertible to form a table and seating unit suitable for use when camping or picnicing. To achieve this, the roof rack is first removed from the vehicle roof. It is then inverted as shown in FIG. 3, so as to stand on the rubber or plastics caps 14 mounted on the upper ends (now the lower ends) of the vertical frame members 13. Thus the panel members 17 and 19 are now the uppermost parts of the roof rack. The wing nuts 26 are then removed from the bolts 25, and the bolts 25 withdrawn from their respective pairs of apertures 15a, 22a so as to free the adjustable panel member 19 and the sub-frame 20 for vertical movement relative to the main framework 10 and the non-adjustable panel member 17. The adjustable panel member 19 is then raised with the vertical extension pieces 22 of the sub-frame 20 being guided by the flanges 23 attached to the intermediate vertical frame members 15 of the side frames 11. When the apertures 15a in these frame members 15 are aligned with the apertures 22b in the upper (now the lower) ends of the vertical extension pieces 22 of the sub-frame 20, the bolts 25 are re-inserted through the newly aligned apertures 15a, 22b and the wing nuts 26 are replaced on the bolts 25 and tightened. Thus the adjustable panel member 19 is raised baove the level of the non-adjustable panel members 17 so as to form a table, while the non-adjustable panel members 17 form respective bench seats. This configuration of the roof rack is shown in FIG. 3. It will be readily understood that the reverse adjustment procedure will re-convert the table and seating unit for use as a roof rack.

It will be appreciated that modifications may be made to the preferred embodiment without departing from the scope of the invention. For example, the side frames 11 and end frames 12 may be formed of sheet material such as wood or metal, and the non-adjustable panel members 17 may each be in the form of two or more individual seats arranged side-by-side. The seats may be upholstered if desired, and the table top may be surfaced for example with a plastics material laminate. Furthermore, the dimensions may be varied, for example to make the best possible use of different roof dimensions. One or more reinforcement bars may be provided, for example between the connector bars 24 of sub-frame 20, so as to improve the load-carrying capacity. It will also be appreciated that the described flanges 23, providing a guide for the sub-frame 20, may be omitted, in which case the sub-frame 20 is merely located and secured in one of its adjustment positions by the bolts 25 and wing nuts 26.

We claim:

1. A vehicle roof rack structure comprising:
    a framework of opposed side frames interconnected by opposed end frames unisonly forming a rectangular box-like configuration of side and end walls,
    a base formed by a pair of panel members extending between the opposed side frames,
    means for adjusting the height of one of the panel members relative to the side frames and the other panel member,
    means for selectively securing the adjustable one of the panel members in a first position substantially coplanar with the other of the panel members for constituting therewith the base of the roof rack and upon inversion of the framework in a second position raised relative to the other of the panel members for constituting therewith a combination table and seating unit, and means for attaching the framework to the vehicle roof when the adjustable one of the panel members is in its first position.

2. A roof rack according to claim 1, including a pair of panel members of the non-adjustable type, one thereof being disposed at each end of the framework and with the panel member of adjustable type being disposed between the two non-adjustable panel members.

3. A roof rack according to claim 2, wherein each non-adjustable panel member is in the form of a bench seat.

4. A roof rack according to claim 2, wherein each non-adjustable panel member is in the form of two or more individual seats arranged side-by-side.

5. A roof rack according to claim 1, wherein the adjustable panel member is supported by adjustable frame members extending perpendicularly relative to the side frames, the adjustable frame members and the side frames having mutually co-operable means for securing the adjustable panel member in at least two positions relative to the side frames.

6. A roof rack according to claim 5, wherein the means for securing the adjustable panel member comprises apertures in the side frames and in the adjustable frame members, the apertures being selectively alignable at a plurality of positions of the adjustable panel member relative to the side frames, and securing members insertable through said selectively aligned apertures to retain the adjustable panel member in its selected position.

7. A roof rack according to claim 6, wherein the securing members are bolts having internally-threaded fasteners mounted thereon.

8. A roof rack according to claim 1, wherein the side frames and end frames are formed of secured together tubular aluminum bars.

9. A roof rack according to claim 1, wherein the side frames and end frames are formed of a sheetlike material.

* * * * *